United States Patent Office 3,192,840
Patented July 6, 1965

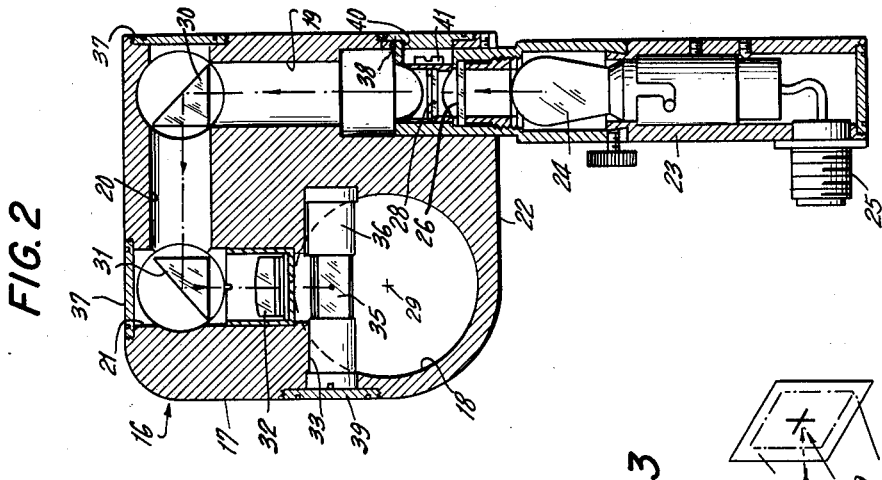
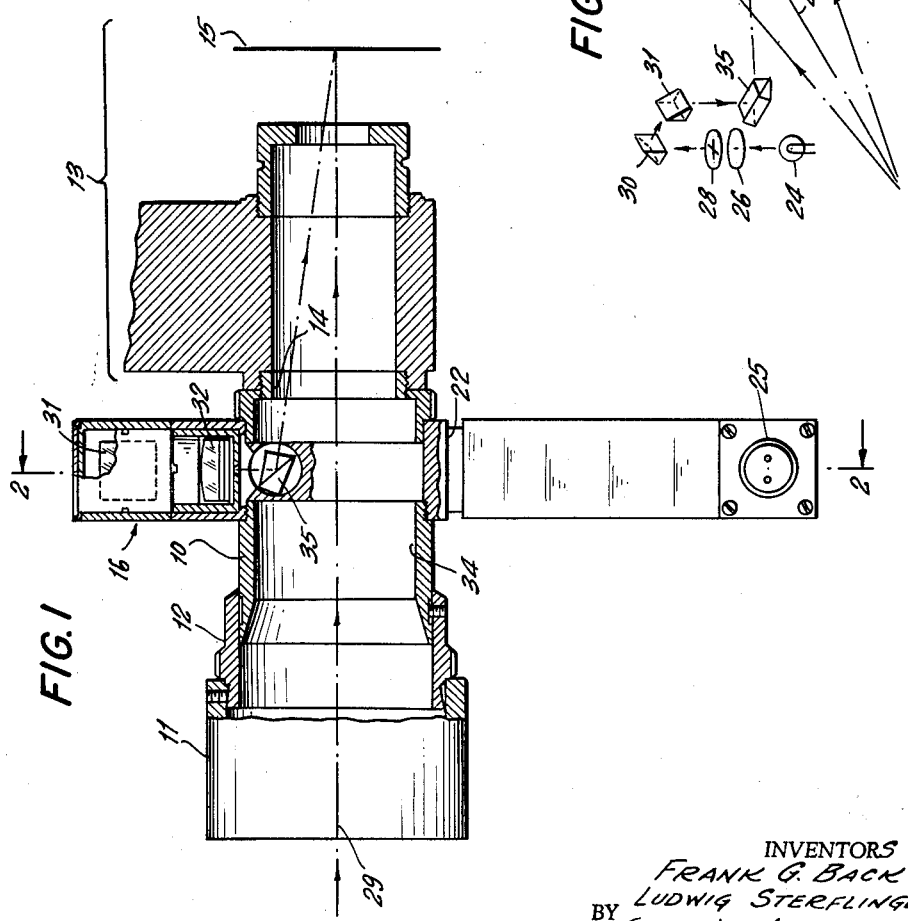
July 6, 1965  F. G. BACK ETAL  3,192,840
RETICLE PRINTING DEVICE
Filed May 10, 1962
INVENTORS
FRANK G. BACK
LUDWIG STERFLINGER
BY
ATTORNEY

3,192,840
RETICLE PRINTING DEVICE
Frank G. Back and Ludwig Sterflinger, Glen Cove, N.Y., assignors to Zoomar, Inc., Glen Cove, N.Y., a corporation of New York
Filed May 10, 1962, Ser. No. 193,830
1 Claim. (Cl. 95—1.1)

This invention relates to a device for projecting the image of a reticle upon the focal plane of a camera or other optical device.

Presently known reticle projecting devices employ light sources which are carried adjacent the lens systems of the cameras or tracking devices upon which they are used. In addition to their large size, these devices heat the lens systems and cause optical changes therein.

Other reticle projecting or printing devices employ beam splitters which result in a loss of light from the primary light source and also produce objectionable internal reflections.

Accordingly, it is an object of the present invention to provide a reticle printer which will not interfere with adjacent lens elements.

Another object of the present invention is to provide a reticle printer which will occupy a minimum amount of space.

A further object of the present invention is to provide a reticle printer which is capable of easy adjustment to bring the image of the reticle to the desired orientation upon the focal plane.

A feature of the present invention is its laterally disposed lamp housing for keeping heat away from the optical elements of the adjacent lens system.

Another feature of the present invention is the use of a series of prisms to direct the light coming from a laterally disposed lamp, through a reticle and on to the focal plane of the camera or tracking device.

A further feature of the present invention is its use of a final prism extending into the lens barrel of the camera or tracking device to project the reticle image without interfering with the light entering the barrel.

A feature of the present invention is the use of rotatable prism mounts whereby the projection system can be adjusted without disassembly.

The invention consists of the construction, combination, and arrangement of parts, as herein illustrated, described and claimed.

In the accompanying drawings, forming a part hereof, is illustrated one form of embodiment of the invention, in which drawings, similar reference characters designate corresponding parts, and in which:

FIGURE 1 is a top plan view of a lens barrel and reticle printer according to the present invention with certain parts broken away.

FIGURE 2 is a cross sectional view taken on line 2—2 in FIGURE 1.

FIGURE 3 is a somewhat schematic view showing the manner in which light coming from a light source is projected upon a focal plane.

Referring to the drawings and specifically to FIGURES 1 and 2, 10 indicates the barrel of a lens system such as may be attached to a camera, tracking device or the like. Lens mounts 11, 12 are rotatably secured to the front of the barrel 10. The lens mounts and their associated lenses (not shown) may be rotated for focusing purposes in the well known manner. The barrel 10 is secured to a camera, generally indicated at 13, by means of a coupling member 14. Light coming through the lens system is focused upon the focal plane 15 within the camera 13.

A reticle printer housing 16 is secured to the barrel 10 and extends laterally therefrom. The housing 16 is in the form of a block 17 having an opening 18 therein to receive the barrel 10.

The block 17 is bored, as indicated at 19, 20, 21, to provide a path from the opening 18 to the outside of the block. As shown in FIGURE 2, the bores 19, 20, 21 describe a path generally parallel to the periphery of the block 17.

A lamp housing 23 is secured to the block 17 in register with the bore 19. In this manner, light coming from the lamp housing 23 can be directed into the block 17. A lamp 24 is carried within the housing 23 and is connected to a source of potential (not shown) through the plug 25.

The light from the lamp 24 passes through a diffuser 26. A reticle plate 28 upon which there is carried the reticle is supported adjacent the diffuser 26 within the bore 19. Light leaving the reticle plate 28 is directed through the bore 19 to a first prism 30 which is mounted at the intersection of bores 19 and 20. The prism 30 redirects the light through the bore 20 to a second prism 31. The second prism 31 is mounted within the block at the intersection of bores 20 and 21. Light from the second prism 31 is directed through the bore 21 at the bottom of which there is carried a third prism 35. The prism 35 is mounted within a prism holder 36 which is freely carried within a transverse bore 33. As shown in FIGURES 2 and 3, the light coming from the lamp 24 is directed through the block 17 in a path substantially normal to the optical axis 29 of the camera lens system. The prism 35 is supported by the prism holder 36 in a position which is within the bore of the barrel 10. As shown in FIGURES 1 and 3, light directed at the prism 35 is reflected by it through the barrel 10 onto the focal plane 15 of the camera or tracking device. By reason of this construction the lamp 24 may be mounted at a distance from the lens elements and heat from the lamp housing 23 will not affect the said lens elements.

A small lens 32 is disposed in the bore 21 between the prisms 31 and 35. The lens 32 serves to adjust the size of the reticle as it is projected upon the prism 35 and focal plane 15.

The housing block 17 is provided with threaded plugs 37 at the ends of bores 20 and 21. The plugs 37 give access to the prisms 30, 31 and permit them to be adjusted without substantial disassembly of the unit. A threaded plug 38 is carried by the block 17 and overlies an opening 40 in the housing adjacent the reticle plate 28. The reticle plate is held by a suitable adjusting screw 41 which is reached through the threaded plug 38. A threaded plug 39 is inserted in the housing 17 and overlies the transverse bore 33. When the threaded plug 39 is removed, the prism holder 36 can be rotated in order to properly position the image of the reticle upon the focal plane 15.

From the foregoing it will be seen that there has been provided a reticle printing device which is capable of easy adjustment and attachment to a lens system. The reticle printer will not interfere with the proper functioning of the lens system to which it is attached inasmuch as heat generated by the printer lamp will be dissipated by the air due to the lateral disposition of the lamp within the device.

Having thus fully described the invention what is claimed as new and desired to be secured by Letters Patent of the United States, is:

A reticle printer for attachment to the lens barrel of a camera or the like comprising, a substantially rectangular block disposed at right angles to the longitudinal axis of the lens barrel, a first, second and a third bore in the block, said bores being substantially parallel to the sides of the block and forming a continuous rectangular path, a lens barrel receiving opening in the block in communication with the third bore, a lamp housing secured to the block in communication with the first bore and extending laterally of the block, a light source in the lamp housing, a first prism within the block at the intersection of the first and second bores to receive the light from the light source, a diffuser between the light source and the first prism, a reticle within the first bore between the diffuser and the first prism, a second prism within the block at the intersection of the second and third bores to receive the light from the first prism, a third prism carried by the block and at least partly extending into the lens barrel and adjacent the wall of said barrel to receive the light from the second prism and direct it on to the focal plane of the camera, the light from the lamp, the first and second prism traversing a path normal to the optical axis of the camera lens and the light from the third prism being convergent with the said optical axis.

References Cited by the Examiner

UNITED STATES PATENTS

| | | | |
|---|---|---|---|
| 2,210,090 | 8/40 | Lutz | 95—1.1 |
| 2,707,423 | 5/55 | Back | 95—1.1 X |
| 2,821,106 | 1/58 | Ranft | 95—1.1 X |

EVON C. BLUNK, *Primary Examiner.*

JOHN M. HORAN, NORTON ANSHER, *Examiners.*